United States Patent
Drachmann et al.

(10) Patent No.: US 10,620,025 B2
(45) Date of Patent: Apr. 14, 2020

(54) FLOW CONDUIT INSERT, ULTRASONIC FLOW METER COMPRISING SUCH FLOW CONDUIT INSERT, AND USE OF A FLOW CONDUIT INSERT

(71) Applicant: Apator Miitors ApS, Aarhus V (DK)

(72) Inventors: Jens Drachmann, Viby J (DK); Pol Martinez Caldwell, Castellón (ES)

(73) Assignee: APATOR MIITORS APS, Aarhus V (DK)

( * ) Notice: Subject to any disclaimer, the term of this patent is extended or adjusted under 35 U.S.C. 154(b) by 0 days.

(21) Appl. No.: 16/081,721

(22) PCT Filed: Mar. 7, 2016

(86) PCT No.: PCT/DK2016/050064
§ 371 (c)(1),
(2) Date: Aug. 31, 2018

(87) PCT Pub. No.: WO2017/152915
PCT Pub. Date: Sep. 14, 2017

(65) Prior Publication Data
US 2019/0072421 A1    Mar. 7, 2019

(51) Int. Cl.
*G01F 1/66* (2006.01)
*G01F 15/14* (2006.01)
(Continued)

(52) U.S. Cl.
CPC .............. *G01F 1/662* (2013.01); *G01F 1/667* (2013.01); *G01F 15/14* (2013.01); *G01F 15/18* (2013.01); *F15D 1/001* (2013.01)

(58) Field of Classification Search
CPC . G01F 1/66; G01F 15/14; G01F 15/15; G01F 15/18
See application file for complete search history.

(56) References Cited

U.S. PATENT DOCUMENTS

| 7,318,354 B2 * | 1/2008 | Visser | G01F 1/58 |
| | | | 73/861.12 |
| 7,650,797 B2 * | 1/2010 | Nielsen | G01F 1/58 |
| | | | 73/861.12 |

(Continued)

FOREIGN PATENT DOCUMENTS

| CN | 103983312 A | 8/2014 |
| CN | 204214501 U | 3/2015 |

(Continued)

OTHER PUBLICATIONS

International Search Report and Written Opinion of International Application No. PCT/DK2016/050064 dated Dec. 13, 2016, 12 pages.

(Continued)

*Primary Examiner* — Jewel V Dowtin
(74) *Attorney, Agent, or Firm* — Lee & Hayes, P.C.

(57) ABSTRACT

Disclosed herein is a flow conduit insert (FCI) for a flow conduit (CON) of an ultrasonic flow meter (UFM), the ultrasonic flow meter (UFM) being arranged to measure a flow of a liquid passing through the flow conduit (CON) by means of an ultrasound signal, the flow conduit insert (FCI) being adapted for being inserted into the inner space of the flow conduit (CON), the flow conduit insert (FCI) being adapted for accommodating the entire path (PTH) in the flow conduit (CON) of the ultrasound signal, the flow conduit insert (FCI) having a first end (1EN) and a second opposite (2EN) end and an inner flow channel (CUN), said first and second ends (1EN, 2EN) being connected by the flow channel (CUN), the flow conduit insert (FCI) being adapted such that the flow of liquid passes through the flow channel (CUN), wherein the flow conduit insert (FCI) comprises a first and a second part (1PA, 2PA) forming the flow channel (CUN), said first and second parts (1PA, 2PA) each extending from said first end (1EN) to said second end (2EN), wherein each of said first and second parts (1PA, 2PA) comprises one or more guide elements (GUE) extend- (Continued)

Figure 1A:
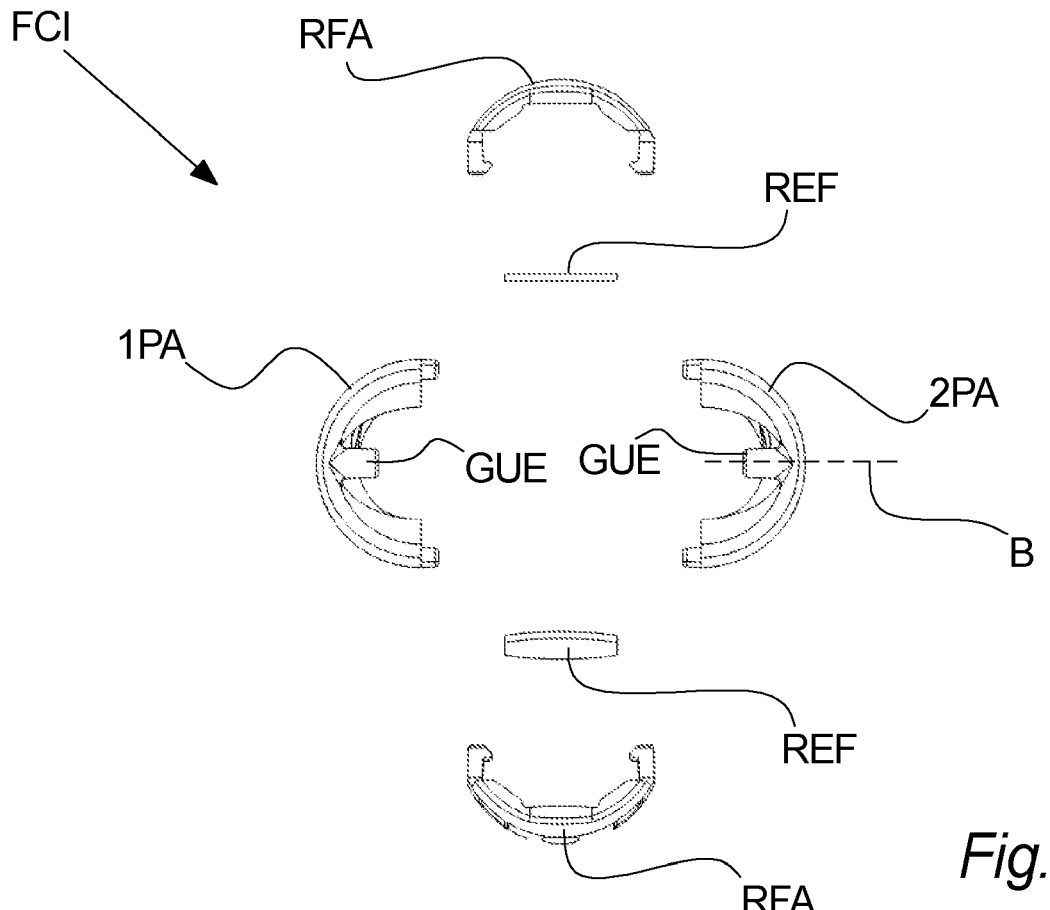

ing into the flow channel (CUN). An ultrasonic flow meter (UFM) comprising such flow conduit insert (FCI) and use of a flow conduit insert (FCI) for correcting flow is also disclosed.

27 Claims, 6 Drawing Sheets

(51) Int. Cl.
 *G01F 15/18* (2006.01)
 *F15D 1/00* (2006.01)

(56) References Cited

U.S. PATENT DOCUMENTS

| | | | |
|---|---|---|---|
| 8,499,648 B2 * | 8/2013 | Sonnenberg | G01F 1/68 73/861.52 |
| 2008/0236297 A1 * | 10/2008 | Fleet | G01F 1/662 73/861.28 |
| 2011/0314931 A1 * | 12/2011 | Iijima | G01F 1/588 73/861.12 |
| 2017/0211956 A1 * | 7/2017 | Drachmann | G01F 1/662 |
| 2018/0120139 A1 * | 5/2018 | Sonnenberg | G01F 1/588 |

FOREIGN PATENT DOCUMENTS

| | | |
|---|---|---|
| EP | 0890826 | 1/1999 |
| EP | 3199923 | 8/2017 |
| FR | 2091908 A | 1/1971 |
| JP | 2005106726 A | 4/2005 |
| WO | WO2013129197 | 9/2013 |
| WO | WO2016012024 | 1/2016 |

OTHER PUBLICATIONS

Written Opinion for International Application No. PCT/DK2016/050064 dated Apr. 19, 2018, 10 pages.

\* cited by examiner

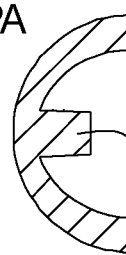
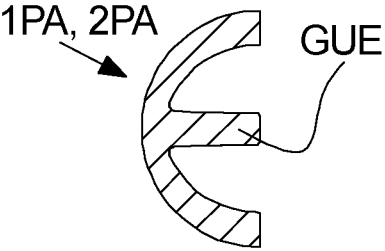
Fig. 2A Fig. 2B Fig. 2C
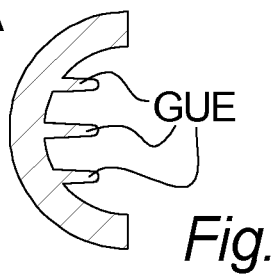
Fig. 2D
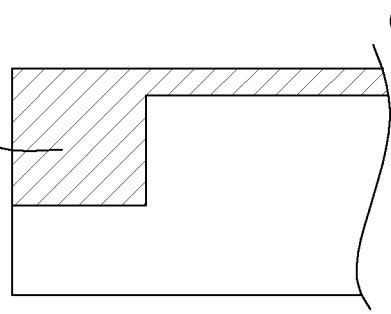 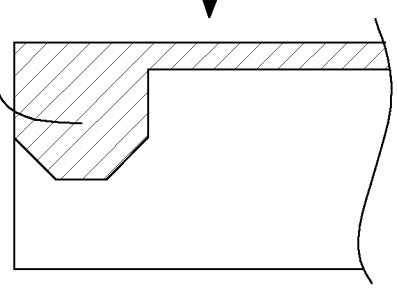
Fig. 3A Fig. 3B
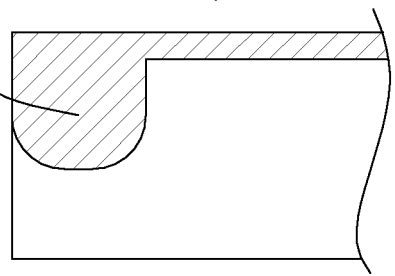 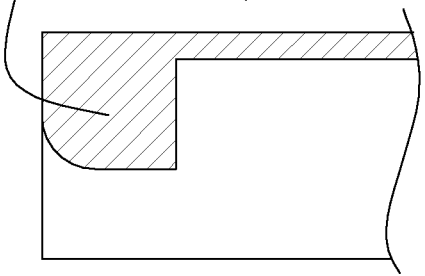
Fig. 3C Fig. 3D

GUE

1PA, 2PA

GUE

GUE

GUE

FLOW CONDUIT INSERT, ULTRASONIC FLOW METER COMPRISING SUCH FLOW CONDUIT INSERT, AND USE OF A FLOW CONDUIT INSERT

CROSS REFERENCE TO RELATED APPLICATIONS

This application is a U.S. National Phase Application of International Application No. PCT/DK2016/050064, filed Mar. 7, 2016, which is hereby incorporated by reference in its entirety.

FIELD OF INVENTION

The invention relates to the field of ultrasonic flow metering, particularly to a flow conduit insert for an ultrasonic flow meter, particularly for ultrasonic flow meters to be used as utility meters. The invention also relates to an ultrasonic flow meter comprising a flow conduit insert and to a use of a flow conduit insert in an ultrasonic flow meter.

BACKGROUND

One problem with measuring flows of liquids by means of utility meters in the form of ultrasonic flow meters is that a velocity of the water is measured and translated into a flow rate or accumulated flow volume. Any inaccuracies in such translation may thus result in inaccurate consumption measuring. Because the flow of liquids in a piping system, the design, configuration and geometry of the piping system, and any obstacle encountered by the liquid in flowing in the piping system affects the flow, it may also affect the measured flow velocity. Some effects, which may affect flow measurements, are rotational flow (also known as swirl) and asymmetric flow. Asymmetric flow may e.g. be when the flow in a certain transversal cross-section of the pipe flows with a higher velocity in one half-part of the cross-section compared to the opposite cross-section. If flow variations outside the path of the ultrasound signal used to measure the flow are present, these are not detected and may lead to inaccuracies or imprecisions of the flow measurements.

Such problem may be solved by increasing the complexity of and/or optimizing the design of the path(s) of the ultrasound signal. One downside of this approach may be that it may lead to increased costs of production, or even opens op for other sources of inaccuracies and/or imprecisions, e.g. if the number of reflectors and/or transducers used is increased. Also, it may also lead to an increased number of parts used to assembly the ultrasonic flow meter, which may complicate assembly and also require more productions lines; both of which may lead to both increased production costs and also to higher vulnerability to production errors.

While solving the above problem, the application of ultrasonic flow meters as utility meters (e.g. for billing purposes) would typically require that certain standards are complied with and/or required by typical customers. One example thereof include ultrasonic flow meters having a relatively large measuring range, including a measuring range that also includes relatively low flow rates. Other examples thereof include that the ultrasonic flow meter can measure flows with relatively high accuracy and precision, and that the ultrasonic flow meters can be produced at a competitive cost level and having a relatively long durability. Some of these requirements may be facilitated e.g. by using better electronics and/or transducers, or modifying the configuration of the ultrasound reflector(s) and ultrasonic transducers. This, however, may also increase the complexity of the ultrasonic flow meter and the production cost thereof considerably.

SUMMARY

The invention relates to a flow conduit insert for a flow conduit of an ultrasonic utility flow meter, the ultrasonic utility flow meter being arranged to measure a flow of a liquid passing through the flow conduit by means of an ultrasound signal, the flow conduit insert being adapted for being inserted into the inner space of the flow conduit, the flow conduit insert being adapted for accommodating the entire path in the flow conduit of the ultrasound signal, the flow conduit insert having a first end and a second opposite end and an inner flow channel, said first and second ends being connected by the flow channel, the flow conduit insert being adapted such that the flow of liquid passes through the flow channel, wherein the flow conduit insert comprises a first and a second part forming the flow channel, said first and second parts each extending from said first end to said second end, wherein each of said first and second parts comprises one or more guide elements extending into the flow channel.

One very significant advantage of the invention may be that more accurate measurements may be facilitated by the use of the flow conduit insert. Specifically, the flow of said liquid may be corrected, so as to reduce or minimize rotation of the liquid (i.e. swirl) and/or asymmetric flow. Correcting the flow leads to a more uniform and predictable flow, regardless of the configuration of the piping system in which the ultrasonic flow meter is installed, thus leading to reduced or minimized dependency of the flow measurement on any such swirl and/or asymmetric flow. In cases where the swirl and asymmetric flow are not corrected, these may influence the flow measurements, since the flow measurements are based on an ultrasound signal passing through a portion of the liquid considered to be representative of the flow. This representation may be imprecise if the swirl and/or asymmetric flow is present.

One further very important advantage of the invention may be that the flow conduit insert may be produced and assembled in a relatively simple manner. Specifically, by using the first and second parts, including their respective one or more guide elements, both the production of the first and second parts by e.g. molding as well as the assembly of the flow conduit insert may be kept relatively simple, thus facilitating minimized production costs.

Thus, the flow conduit insert may be assembled from at least said first and second part. Since the first and a second part, forming the flow channel, each extend from said first end to said second end, the flow conduit insert can be said to be, after assembly, divided along the longitudinal direction of the flow conduit. The division may in some embodiments be e.g. along a certain plane, e.g. a plane parallel to the longitudinal direction of the flow conduit insert, optionally apart from e.g. one or more locking or guiding pins or similar locking or guiding arrangements. The plane may or may not include the longitudinal center axis of the flow conduit. In some alternative embodiments, the plane of division may not necessarily be parallel with the longitudinal direction of the flow conduit insert, and may thus be oriented with an angle of e.g. 5 degrees with respect to the longitudinal direction of the flow conduit. In some further alternative embodiments, the division may have a more complex geometry that deviates substantially from a plane, and may e.g. include edges and/or curvature.

One further advantage of the invention may be that the flow conduit insert may facilitate an increase of the flow velocity of the liquid along the path of the ultrasound signal, which may extend the measuring range (i.e. the range of flow rates which the meter can measure with satisfactory precision) of the ultrasonic flow meter to lower flow rates, which may be a significant advantage, for example when the ultrasonic flow meter is used as a utility meter.

In the context of the intention, it should be understood that each of the first and second parts, including their respective one or more guide elements, is formed without any joining, and that the first and second parts therefore each can be molded as one single piece.

A further advantage of the invention may be that the first and second parts may be produced e.g. by molding in a relatively simple manner, and particularly without comprising any so-called undercuts. Molding of objects with undercuts may be advantageous in the sense that relatively complex geometries may be realized; however, when by avoiding the use of undercuts, production may often be significantly simpler.

Generally, it should be understood that the "longitudinal direction" of the flow conduit and the "longitudinal center axis" of the flow conduit is considered to be parallel. Similarly, it should be understood that these are also parallel with the longitudinal direction of the flow conduit insert, and the longitudinal center axis of the flow conduit insert, when the flow conduit insert has been inserted into the flow conduit. Thus, when defining orientations, these terms may be used interchangeably.

Also, it should be understood that the flow conduit has an inner space for allowing flow of liquid, and that it is this inner space that the flow conduit insert is adapted to be inserted into.

In the context of the present invention it should be understood that the term "ultrasonic utility flow meter" is a utility meter in the form of an ultrasonic flow meter. Such utility meters may typically be configured to measure consumption of e.g. a public utility, often for billing purposes. Thus, the terms "ultrasonic flow meter" and "ultrasonic utility flow meter" are used interchangeable herein, with the intended meaning as a utility meter in the form of an ultrasonic flow meter.

The flow conduit insert according to the invention is adapted for accommodating the entire path of the ultrasound signal after having been inserted into the inner space to the flow conduit. It should be understood that the ultrasound signal has a path inside the flow conduit, from the position of entering the flow conduit, via one or more reflectors, if any, and to the position of leaving the flow conduit. The flow conduit insert is adapted for accommodating this path entirely.

According to an embodiment, this entire path exists between two transversal planes each comprising one of the opposite end points of the flow conduit insert along the longitudinal direction of the flow conduit insert, when the flow conduit insert have been inserted into the flow conduit. These end points are to be understood as the point of the flow conduit insert farthest in each direction along the longitudinal direction of the flow conduit insert.

According to an embodiment the entire path exists between said first and second ends, when the flow conduit insert have been inserted into the flow conduit. According to an embodiment, the entire path is contained in the part of the flow conduit between said first end of the flow conduit insert and said second end of the flow conduit insert.

In the context of the invention it should be understood that accommodating the entire path of the ultrasound signal means that no part of the ultrasonic signal would exist in the flow conduit other than between said first and second ends of the flow conduit insert.

Moreover, it should be understood that said path of the ultrasonic signal is the intended route for the ultrasonic signal to propagate between a first and a second ultrasonic transducer of the ultrasonic flow meter. Thus, it would not include any unintended propagation of ultrasound, unintended reflections, un-intended divergence of ultrasound, if any. Such unintended propagation etc. of the ultrasonic signal may often be hard or practically impossible to completely avoid.

It should generally be noted that the terms "ultrasound" and "ultrasonic" may in some cases be used interchangeably, e.g. in relation to the ultrasonic flow meter, the ultrasonic signal, the ultrasonic reflector(s), the ultrasonic transducers, etc.

Generally it should be understood that orientations described herein are given relative to the longitudinal direction of the flow conduit, unless specifically otherwise stated. Also, it should generally be understood any orientation being defined relative to the flow conduit are when the flow conduit insert has been inserted into the inner space of the flow conduit. It should generally be understood that the longitudinal direction of the flow conduit and the longitudinal direction of the flow conduit insert are parallel after the flow conduit insert has been inserted into the inner space of the flow conduit. Thus, the longitudinal direction of the flow conduit and the longitudinal direction of the flow conduit insert may be used interchangeably, with regard to the above. This applies even for embodiments where the dimension of the flow conduit insert along the longitudinal direction of the flow conduit, when installed, is less that the dimension of the flow conduit insert in a direction orthogonal thereto, e.g. a diameter for tubular flow conduit inserts.

Even further, the flow conduit insert should according to an embodiment be adapted to allow passage of the ultrasonic signal from the ultrasonic flow meter through at least part of the flow channel, i.e. allowing the path of the ultrasonic signal to propagate through at least part of the flow channel. In more detail, in order to accommodate the entire path of the ultrasound signal, the longitudinal length of the flow conduit insert must, according to this embodiment, be at least the distance between a first and a second ultrasonic transducer in the ultrasonic flow meter. Furthermore, the flow conduit insert must, according to this embodiment, be adapted for allowing the path of the ultrasound signal to enter and leave the flow conduit in the flow conduit insert zone, i.e. the zone where the flow conduit insert is positioned. Even further, when using one or more ultrasound reflectors to reflect the ultrasound, the flow conduit insert must, according to this embodiment, allow for the path of the ultrasound signal to reach these ultrasound reflectors. In some embodiments, this is facilitated by installing the one or more ultrasound reflectors in the flow conduit insert. Even further, in some other embodiments, the inner surface of the flow conduit may be used as an ultrasound reflector, e.g. when the flow conduit is made of a metal such as brass; in such embodiments the flow conduit insert must allow the ultrasound signal to reach the inner surface of the flow conduit to facilitate the desired reflection.

According to an embodiment of the invention, the flow conduit insert is adapted such that the path of the ultrasonic signal in the flow conduit is between said first and second end of the flow conduit insert, when the flow conduit insert is installed in the flow conduit.

Thus, according to the above embodiment, the ultrasonic signal has a path inside the flow conduit, from the position of entering the flow conduit, via one or more reflectors, if any, and to the position of leaving the flow conduit. According to this embodiment, the entire path is contained in the part of the flow conduit between said first end of the flow conduit insert and said second end of the flow conduit insert.

According to an advantageous embodiment of the invention, the flow conduit insert has an outer periphery corresponding to the inner shape of the flow conduit.

Thus, according to the above embodiment, the flow conduit insert may both be adapted for being axially inserted into the flow conduit but also being supported by the flow conduit such that the flow conduit insert is prevented from moving in all directions, optionally other than along the axial direction, i.e. the direction parallel to the longitudinal center axis of the flow conduit. Also, the flow conduit insert is prevented from rotation, optionally apart from rotation about the longitudinal center axis of the flow conduit. Even such rotational freedom, if any, may be eliminated after insertion of the flow conduit insert, e.g. by fixation by means of a housing of the ultrasonic flow meter, or separate fixation means or fixation pins.

According to an embodiment of the invention, said outer periphery has an outer periphery corresponding to a substantially tubular inner shape of the flow conduit.

Thus, the outer periphery of the flow conduit insert may in some cases be substantially tubular. However, in other cases, the outer periphery may be more complex, but it must be still, according to the above embodiment, be formed such that it corresponds to a substantially tubular inner shape, i.e. such that it can be supported by the flow conduit.

According to an embodiment of the invention, said outer periphery comprises one or more depressions and/or through-holes.

The through-holes may include through-holes for allowing the ultrasonic signal to enter and leave the flow channel through the outer periphery, and/or one or more through-holes for receiving an ultrasound reflector.

According to an advantageous embodiment of the invention, said outer periphery comprises a first and a second through-hole, for allowing the ultrasonic signal to enter and leave the flow channel through the outer periphery.

Thus, it may be ensured that the entire path of the ultrasonic signal is accommodated within the flow conduit insert.

According to an advantageous embodiment of the invention, the flow conduit insert having an elongated shape.

For example, the flow conduit insert may have a length (i.e. dimension along the longitudinal direction of the flow conduit) that exceeds the diameter of the flow conduit insert, for example being at least 1.5 times the diameter, such as at least 2 times the diameter, such as at least 3 times the diameter, such as at least 4 times the diameter, such as at least 6 times the diameter, such as at least 8 times the diameter, such as at least 10 times the diameter or more.

According to an advantageous embodiment of the invention, the flow conduit insert is adapted for increasing the flow velocity of the liquid through the flow channel.

Generally, it should be understood that a flow velocity is understood as a distance per time, i.e. different from a flow rate being a volume per time. Thus, the terms "velocity" and "speed" may be used somewhat interchangeably herein.

One advantage of the above embodiment may be that the ultrasonic flow meter may thereby be able to measure lower flow rates with sufficient precision. Especially when using transit-time ultrasonic flow meters, the measured flow rate is at least partly based on the transit time of the ultrasound signal, and in more detail the change of the transit time caused by the flow of liquid, e.g. by measuring the difference in transit time between an ultrasound signal travelling along a certain predetermined path in one direction ("upstream") and an ultrasound signal travelling along the same path, but in the opposite direction ("downstream"). If the flow rate is low, the change of transit time is correspondingly little, and the signal-to-noise ratio may thus decrease, leading to a decreased precision. However, by increasing the flow velocity along the path of the ultrasonic signal, even with the same flow rate, the interaction between the liquid and the ultrasonic signal is increased, leading to an increase change in transit time caused by the same flow rate, again leading to an increased precision.

According to an advantageous embodiment of the invention, the one or more guide elements comprises one or more guide wings.

Thus, it should be understood in relation to the invention that the guide wings is formed as an integral part of the first and second part of the flow conduit insert, respectively.

One advantage of the above embodiment may be that guide wings may be useful for facilitating a relatively effective correction of the flow, whereas it may only cause an acceptable low decrease in pressure.

According to an embodiment of the invention, the one or more guide elements consists of one or more guide wings. I.e. that each guide element consists of a guide wing.

According to an advantageous embodiment of the invention, the one or more guide elements are formed as guide wing(s). I.e. that each guide element is formed as a guide wing.

According to an embodiment if the invention, the one or more guide wings are substantially parallel with a longitudinal direction of the flow conduit insert.

According to an advantageous embodiment of the invention, the one or more guide elements are substantially parallel with a longitudinal direction of the flow conduit insert.

Thus, the one or more guide elements, which may e.g. be guide wings, are oriented substantially parallel with the longitudinal direction of the flow conduit insert, and also with the longitudinal direction of the flow conduit, when the flow conduit insert is installed therein. The guide elements according to this embodiment must have an elongated shape of some sort, so that their orientation can be parallel with the longitudinal direction, as stated. By having an elongated shape, the guide element(s) may include surfaces interacting with the liquid. These surfaces may themselves be parallel with the longitudinal direction of the flow conduit insert, or may in some embodiments, have e.g. curved surfaces interacting with the flow of liquid such that the overall longitudinal direction of that guide element is parallel to the longitudinal direction.

However, it should be understood that each guide element, according to the above embodiment, must be substantially parallel with the longitudinal direction of the flow conduit insert. Thus, this embodiment does not cover situations where some guide elements are oriented with a non-zero angle relative to the longitudinal direction of the flow conduit and other guide elements are oriented with a similar, but opposite non-zero angle relative to the longitudinal direction. The parallel orientation of the guide elements may also facilitate relatively simple production of the first and second parts by means of e.g. molding, even when the first and second parts have a relatively complex geometry.

According to an advantageous embodiment of the invention, the longitudinal center axis of the flow conduit is free of contact with the flow conduit insert, including the guide elements thereof.

One advantage of the above embodiment may be that the pressure drop induced by the flow conduit insert is minimized. Since the flow velocity may typically be greatest along the longitudinal center axis of the flow conduit (except when the flow is asymmetric), it may thus be advantageous not to obstruct the flow along the longitudinal center axis. Even if the flow is somewhat asymmetric. the pressure drop of the above embodiment may still be relatively low, especially if some distance exists between the longitudinal center axis of the flow conduit and the nearest point of the guide elements.

According to an advantageous embodiment of the invention, the flow conduit insert is adapted to allow a line of sight through the inner flow channel.

One advantage of the above embodiment may be that the ultrasonic flow meter may be inspected for example to see if any foreign object is lodged inside the flow conduit.

According to an embodiment of the invention, the flow channel has a transversal cross-sectional area corresponding to at least 25% of the transversal cross-sectional area of the flow conduit along the entire longitudinal length of the flow conduit insert, such as at least 50%, such as at least 75%.

According to an embodiment of the invention, a transversal gap exists between the guide elements of each group of guide elements, the transversal gap having a width corresponding to at least 5% of the diameter of the flow conduit, wherein the transversal gap extends of the longitudinal center axis of the flow conduit, and wherein the transversal gap is substantially symmetrical with respect to the longitudinal center axis of the flow conduit. In certain further embodiments, the width corresponds to at least 10% of the diameter of the flow conduit, such as at least 25%, such as at least 50%, such as at least 75%, such as at least 90%.

According to an embodiment of the invention, the effective inner diameter of the flow channel is no more than 90% of the inner diameter of the flow conduit, such as no more than 80%, such as no more than 70%. Here, the effective inner diameter of the flow channel may be understood as the minimum diameter of the flow channel, when evaluated over the entire length of the flow conduit insert.

According to an advantageous embodiment of the invention, the flow conduit insert is adapted for supporting one or more ultrasound reflectors.

Thus, the one or more reflectors may be positioned outside the flow channel or in the periphery of the flow channel, whereby any pressure drop induced by the one or more reflectors may be reduced or minimized.

Having a pressure drop being low may typically be regarded as advantageous, since pumping pressure used to pump the liquid through a certain piping system may thus be at a lower level. I.e. having a higher pressure drop may necessitate a higher pumping pressure, using more energy and also inducing more wear on the pump and/or the piping system.

According to an embodiment of the invention, the flow conduit insert comprises the one or more ultrasound reflectors and/or the one or more reflector fixation arrangements for fixating the one or more ultrasound reflectors to the first and/or second part.

According to an advantageous embodiment of the invention, the flow conduit insert is adapted for receiving one or more reflector fixation arrangements, the first and/or second part together with the one or more reflector fixation arrangements being adapted for fixating one or more ultrasound reflectors.

The reflector fixation arrangement(s) may in some embodiments be arranged to fixate to the first and second parts relative to each other.

According to an embodiment of the invention, the one or more reflectors may be arranged such that the path of the ultrasonic signal may extend all the way across the inner flow channel.

According to an advantageous embodiment of the invention, the ultrasonic flow meter comprises at least three ultrasound reflectors and a first and second ultrasonic transducer, where each of the first and second ultrasonic transducer are arranged for emitting an ultrasound signal in a non-orthogonal direction relative to the longitudinal direction of the flow conduit, for example in a direction oriented with an angle between 10 and 80 degrees relative to said longitudinal direction.

One advantage of the above embodiment may be that the combination of using guide elements and using the above described orientation of ultrasonic transducers may result in ultrasonic flow meter being particularly precise and robust to irregular flows, such as swirl and/or asymmetric flow. The above described embodiment may be especially advantageous when using guide elements, which induces a relatively little pressure drop.

The above described advantage may be especially pronounced when the guide elements are formed as wings, in particular when the wings are substantially parallel to the longitudinal direction of the flow conduit insert.

According to an embodiment of the invention, the ultrasonic flow meter comprises at least three ultrasound reflectors, the path of the ultrasound signal at the position of entry into the flow conduit being non-orthogonal to the longitudinal direction of the flow conduit, such as oriented with an angle between 10 and 80 degrees relative to said longitudinal direction, and the path of the ultrasound signal at the position of leaving the flow conduit being non-orthogonal to the longitudinal direction of the flow conduit, such as oriented with an angle between 10 and 80 degrees relative to said longitudinal direction.

According to an advantageous embodiment of the invention, at least one guide element of the first part and at least one guide element of the second part are arranged in a group, such that these at least two guide elements are arranged at substantially the same longitudinal position.

For example, the group may consist of one guide element of the first part and one guide element of the second part, where the two guide elements are arranged in corresponding opposite positions. Here, corresponding opposite positions are to be understood as a position having the same longitudinal position relative to the longitudinal direction of the flow conduit insert. By having substantially the same longitudinal positions, i.e. relatively to the longitudinal direction of the flow conduit, the group of guide elements is thus formed. The flow conduit insert may comprise one or more groups of guide elements.

According to an embodiment of the invention, the one or more guide elements of each of the first and second parts are arranged in group(s) of at least two, such that each group comprises at least one guide element of the first part and at least one guide element of the second part, the at least two guide element being arranged at substantially the same longitudinal position relative to the longitudinal direction of the flow conduit insert.

Thus, the guide elements are, according to the above embodiment, arranged in pairs (i.e. groups of two) or groups of three or more. Particularly, it may in some embodiments be advantageous to arrange the guide elements such that they within each group are positioned with an equal number of guide elements on each of the first and second parts, i.e. resulting in an even number of guide elements in each group.

The above embodiment may be especially advantageous when the guide elements are formed as guide wings, particularly wings being substantially parallel to the longitudinal direction of the flow conduit insert. Other guide elements may also be used.

The above embodiment may be especially advantageous when the guide element(s) are substantially parallel to the longitudinal direction of the flow conduit insert, since e.g. molding of the first and second parts may thus be realized in a simpler manner, e.g. by using a mold comprising only two parts for defining the shape of the first and/or second part. Particularly, by avoiding undercuts, the production of the first and second parts may be significantly simpler.

According to an embodiment of the invention, the flow conduit insert comprises at least two groups of guide elements, at least group being positioned at or near each of said first and second end, respectively, of the flow conduit insert.

In other words, the flow conduit insert comprises at least two groups of guide elements, such as wings. At least one group is positioned at or near said first end of the flow conduit, whereas at least one other group is positioned at or near said second end of the flow conduit. In some embodiments where there are more than two groups, two or more groups of guide elements, such as wings, may be positioned at or near said first and/or second end.

One advantage of the above embodiment may be that the flow of liquid exiting the flow conduit insert resembles to a higher extend the flow of liquid entering the flow conduit insert. This may be highly advantageous when testing ultrasonic flow meters, since this may often be performed having a sequence of several adjacent ultrasonic flow meter connected in serial, sometimes up to e.g. 10, 20 or even more ultrasonic flow meters. Due to the presence of a group of guide elements at or near each of said first and second ends, any downstream effect on the flow caused by the flow conduit insert may be minimized or eliminated.

One further advantage of the above embodiment may be that the flow conduit insert does not limit the ultrasonic flow meter to be able to measure flow in only one direction.

The above embodiment may be especially advantageous when the guide element(s) are substantially parallel to the longitudinal direction of the flow conduit insert, since e.g. molding of the first and second parts may thus be realized in a simpler manner, e.g. by using a mold comprising only two parts for defining the shape of the first and/or second part.

According to an embodiment of the invention, the one or more guide elements are arranged in the vicinity of said first and/or second end.

According to an advantageous embodiment of the invention, the flow conduit insert comprises three regions along the longitudinal direction of the flow conduit insert, said three regions being two flow correcting regions and one measuring region, where the measuring region is positioned between the two flow correcting regions, and where each flow correcting region comprises at least one group of guide elements comprising at least one guide element of the first part and at least one guide element of the second part arranged at substantially the same longitudinal position of the flow conduit insert.

The above embodiment may be especially advantageous when the guide element(s) are substantially parallel to the longitudinal direction of the flow conduit insert, since e.g. molding of the first and second parts may thus be realized in a simpler manner, e.g. by using a mold comprising only two parts for defining the shape of the first and/or second part.

According to an embodiment of the invention, the guide elements of each group of guide elements are free of contact with each other, i.e. separated by a distance, the distance corresponding to at least e.g. $\frac{1}{10}$ of the inner diameter of the flow conduit.

According to an embodiment of the invention, a gap exists between the guide elements in each group of guide elements.

According to an advantageous embodiment of the invention, each of the guide elements has a transversal cross-sectional area of no more than 15 percent of the corresponding transversal cross-sectional area of the flow channel, such as no more than 10 percent, such as no more than 5 percent.

In connection with the above it should be understood that the "corresponding" transversal cross-sectional area of the flow channel is the transversal cross-sectional area in the same longitudinal position, relative to the longitudinal direction of the flow conduit, being the free area which would have been available if no guide element(s) was present.

For example, the guide elements may have a transversal cross-sectional area of 1-15 percent of the corresponding transversal cross-sectional area of the flow channel, such as 2-10 percent, such as 3-5 percent.

According to an advantageous embodiment of the invention, said first and second parts are substantially symmetric, for example by having a mirror symmetry in a plane parallel to the longitudinal direction of the flow conduit insert, or by being substantially identical.

One advantage of the above embodiment may be that the flow conduit insert may be adapted by cancelling out any formed swirl, if any, since for each swirl-inducing guide element, if any, a corresponding mirror symmetric guide element cancelling out the swirl would exist.

A further advantage of the above embodiment may be that when the first and second parts are substantially identical, they may be produced by only a single production tool with a single type of mold, instead of having to use different molds. This may decrease production costs of the flow conduit insert considerably. Further advantages may include that the risk of accidental mix-ups of different parts may be eliminated by the first and second parts being identical, and that production and logistics may be significantly simplified.

According to an embodiment of the invention, said first and second parts are substantially identical.

According to an advantageous embodiment of the invention, the one or more guide elements comprises one or more guide wings having rounded-off or cut-off corners, e.g. such that any corners have angles more than 90 degrees, preferably more than 120 degrees.

The corners of the above embodiment may include corners of the guide wings when viewed from a position removed from the guide wing in question in a direction substantially orthogonal to the plane defined by that guide wing, or corners when viewed from the longitudinal center axis of the flow conduit insert at the same longitudinal position as the guide wing, and also corners when viewed from a position removed from the guide wing only along the longitudinal direction of the flow conduit insert. The corners may also include several of the above mentioned types of corners, or all.

One significant advantage of the above embodiment may be that any hairs or strings, or other similar elongated objects may pass through the flow conduit insert, instead of accumulating at the guide elements.

Further advantages of the above embodiment may include that any need for undercuts may be eliminated, and that the first and second parts may be more easily removed from the mold if produced by molding, that the guide wings induce a smaller pressure drop, and that cavitation may be minimized or avoided.

The corners referred to in the above embodiment are corners of the guide element in cross-sections parallel with the longitudinal direction of the guide element and/or the longitudinal direction of the flow conduit.

Thus, according to the above embodiment, corners of 90 degrees may be avoided, e.g. by utilizing rounded or cut-off corners.

According to an embodiment of the invention, the wings have cut-off corners, e.g. such that the corners have angles more than 90 degrees, preferably more than 120 degrees.

Thus, according to the above embodiment, corners of 90 degrees may be avoided, e.g. by utilizing rounded or cut-off corners.

According to an embodiment of the invention, the guide wings has an edge facing away from the center position along the longitudinal direction of the flow conduit insert, where this edge is characterized by having an outer radius of at least 0.2 millimeters.

Advantages of the above embodiment may include that the need for undercuts may be eliminated, and that the first and second parts may be more easily removed from the mold if produced by molding, that the guide wings induce a smaller pressure drop, and that cavitation may be minimized or avoided. Also, the production of a mold for forming the first and second parts may be simpler.

According to an embodiment of the invention, the one or more guide elements are adapted to induce turbulence in the flow of the liquid.

For example, the one or more guide elements may be formed such that they have edges. Edges, particularly sharp edges, may be relatively effective in inducing turbulent flow.

One advantage of inducing turbulence may be that asymmetric flow may be reduced or eliminated.

According to an advantageous embodiment of the invention, the one or more guide elements comprises one or more guide wings each having two opposite surfaces for contacting the liquid, the two surfaces having mirror symmetry in a plane being substantially parallel with the longitudinal direction of the flow conduit insert.

According to an advantageous embodiment of the invention, the one or more guide elements comprises one or more guide wings being substantially parallel to the longitudinal direction of the flow conduit insert, and wherein the guide wings have a broader width in the end facing towards the nearest end of the flow conduit insert compared to the width in the end facing in the opposite direction.

Thus, according to the above embodiment, the width is the thickness of the guide wing in a tangential direction relative to the longitudinal direction of the flow conduit.

The above embodiment is especially relevant for embodiments where the flow conduit insert comprises three regions, two flow correcting regions, and a measuring region in between.

According to an embodiment of the invention, the flow conduit insert is adapted to be fixated inside the flow conduit by means of a housing of the ultrasonic flow meter.

Here, the housing of the ultrasonic flow meter should be understood as a housing enclosing at least the transducer(s) of the ultrasonic flow meters. It may in some embodiments also enclose further components, such as electronic control circuits, antennas, power sources such as batteries, display(s), etc.

Thus, the flow conduit insert may be fixated with respect to axial movement, i.e. movement along the longitudinal direction of the flow conduit. The fixation may be provided by forming one or more holes and/or depressions in the flow conduit insert such that one or more corresponding protrusions of the meter housing may extend into the flow conduit and engage the one or more holes and/or depressions, thereby preventing any subsequent axial movement of the flow conduit insert relative to the flow conduit.

According to an embodiment of the invention, said liquid is a water-based liquid, such as e.g. drinking water, utility water, heating water e.g. for district heating or central heating, cooling water e.g. for district cooling or central cooling, or waste-water.

According to an advantageous embodiment of the invention, the ultrasonic flow meter comprises two ultrasonic transducers adapted for measuring the flow of the liquid flowing through the flow conduit by means of transit time measurement.

According to some embodiments the absolute transit times of the ultrasonic signal may be calculated by comparing with a simulated response of the transducers.

According to an embodiment of the invention, the ultrasonic flow meter is adapted for use as a utility meter.

According to an advantageous embodiment of the invention the guide elements are formed as guide wings defined by a plane being substantially orthogonal to a plane dividing the first and second parts.

According to an advantageous embodiment of the invention the first and second parts are made substantially from a composite material, such as a glass reinforced polymer, such as polybutylene sulfide (PBS).

According to an advantageous embodiment of the invention the first and/or second parts are formed by molding, such as injection molding.

According to an advantageous embodiment of the invention the first and second parts are formed by molding, such as injection molding.

According to an advantageous embodiment of the invention the shape(s) of the first and/or second part(s) is/are is adapted to be formable by molding, such as injection molding.

According to an advantageous embodiment of the invention the first and/or second parts are free of undercuts.

According to an advantageous embodiment of the invention the first and second parts are free of undercuts.

According to an advantageous embodiment of the invention the shape(s) of the first and second part(s) is/are is adapted to be formable by molding, such as injection molding, and wherein the first and second parts are free of undercuts.

According to an advantageous embodiment of the invention the first and second parts are formed by molding, such as injection molding, and wherein the first and second parts are free of undercuts.

The invention further relates to an ultrasonic flow meter comprising a flow conduit and a flow conduit insert according to the invention or any embodiment thereof, the flow conduit insert being arranged in the flow conduit, and the ultrasonic flow meter being adapted for measuring a flow of a liquid passing through the flow conduit.

The ultrasonic floe meter of the invention may be advantageous due to the presence of the flow conduit insert of the invention, as described herein.

According to an advantageous embodiment of the invention, the ultrasonic flow meter comprises two ultrasonic transducers adapted for measuring the flow of the liquid flowing through the flow conduit by means of transit time measurement.

According to some embodiments the absolute transit times of the ultrasonic signal may be calculated by comparing with a simulated response of the transducers.

According to an advantageous embodiment of the invention, the ultrasonic flow meter comprises one or more reflectors, said one or more ultrasound reflectors being arranged for reflecting an ultrasound signal emitted from one of the ultrasonic transducers in a direction along a predefined path ending at the other ultrasonic transducer, and vice versa.

The flow conduit insert is adapted and arranged to accommodate the entire predefined path of the ultrasonic signal.

According to an advantageous embodiment of the invention, the ultrasonic flow meter is adapted for use as a utility meter.

According to an advantageous embodiment of the invention, the flow conduit insert according to the invention or any embodiment thereof is adapted for use in an ultrasonic flow meter according to the invention or any embodiment thereof.

The invention further relates to a use of a flow conduit insert according to the invention or any embodiment thereof for correcting a flow of liquid in a flow conduit of an ultrasonic flow meter according to the invention or any embodiment thereof.

FIGURES

Figure 4A:
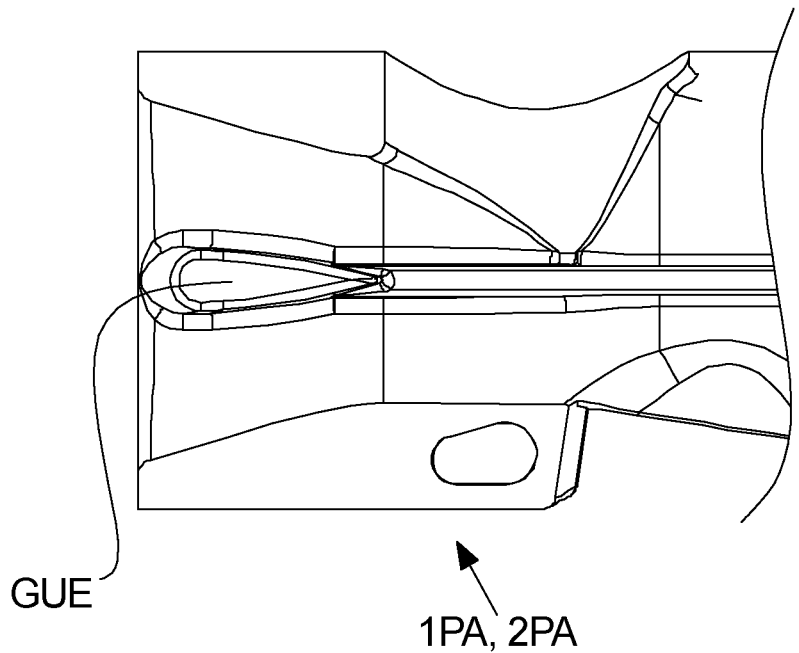
Figure 4B:
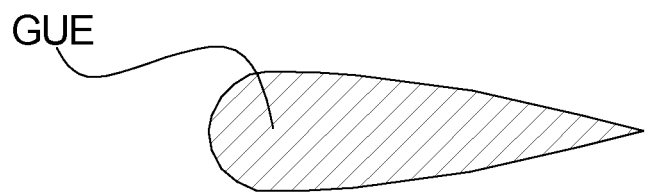
Figure 4C:
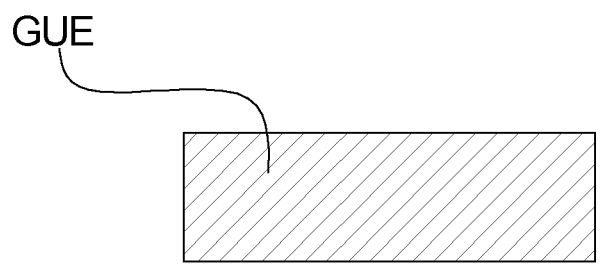
Figure 4D:
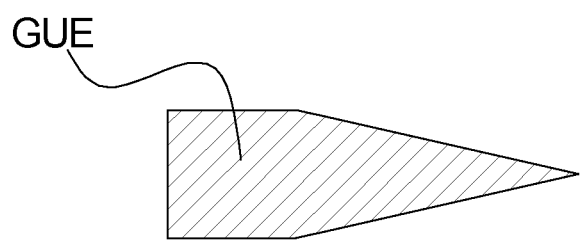
Figure 5A:
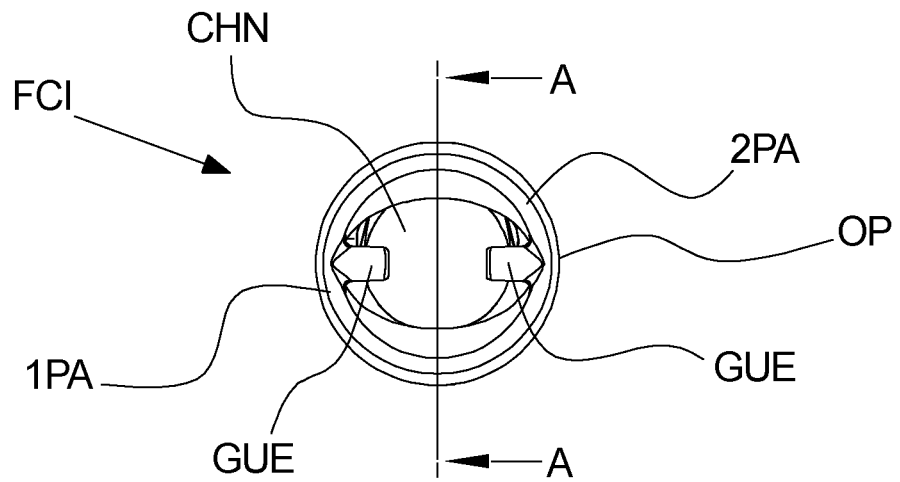
Figure 5B:
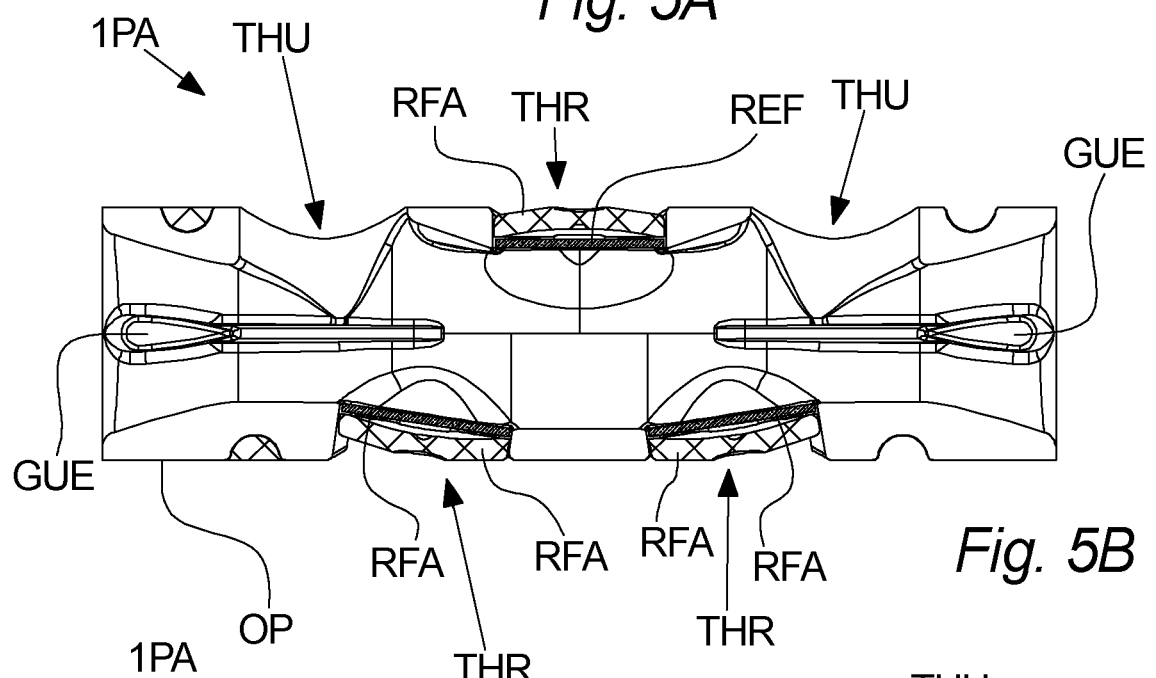
Figure 5C:
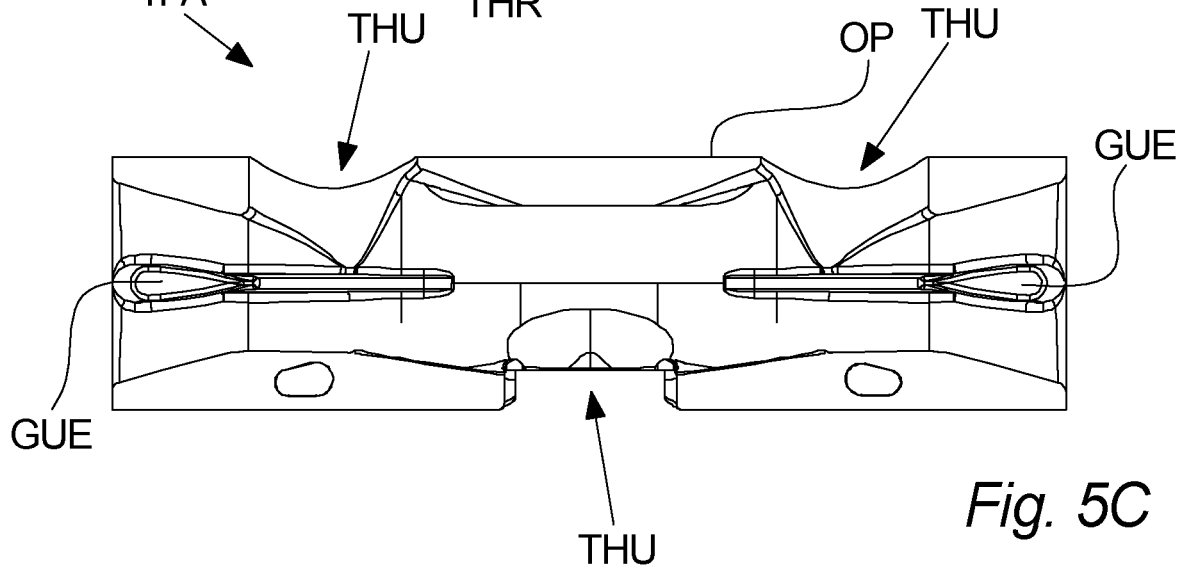
Figure 6:
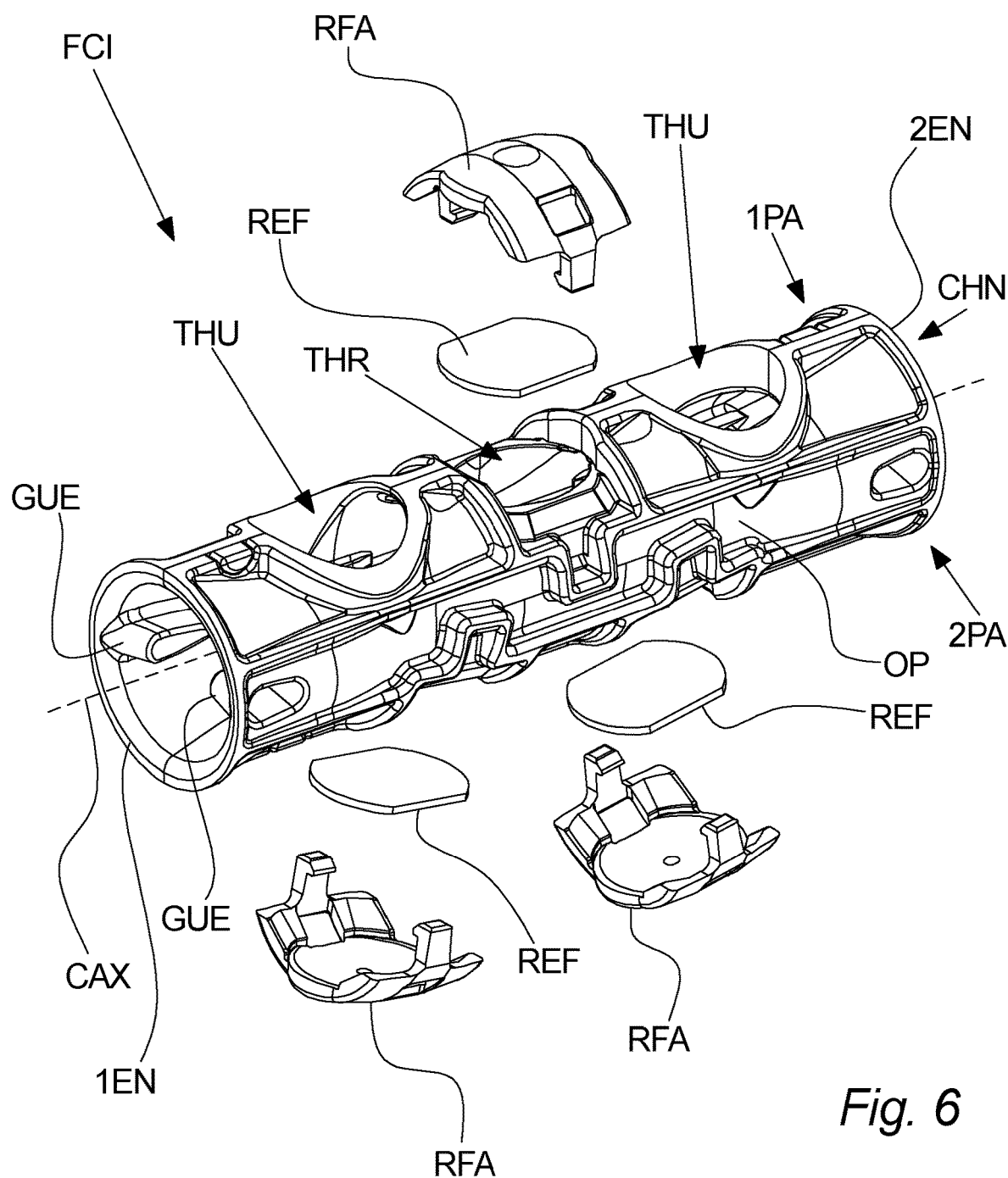
Figure 7:
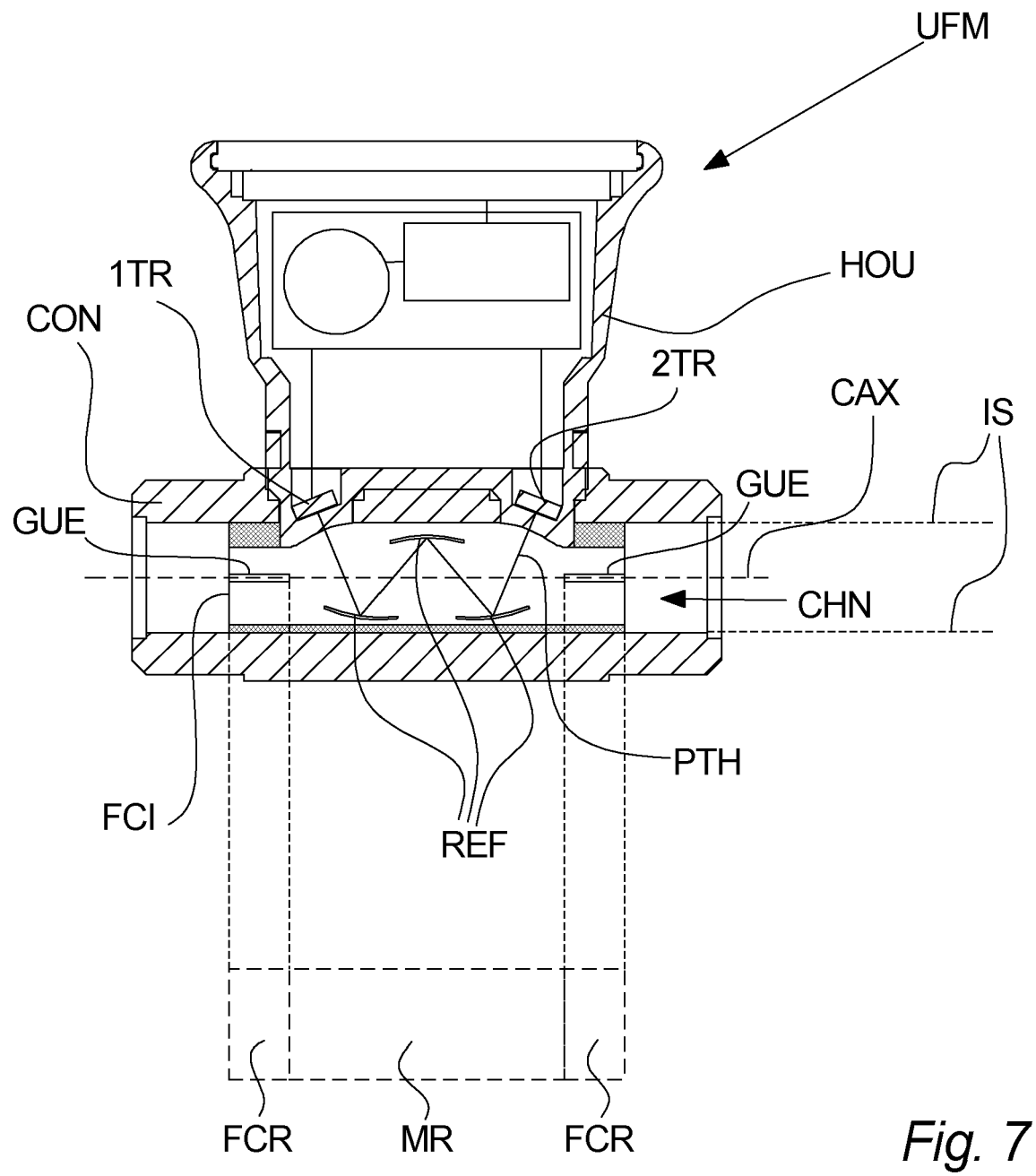

The invention will be described in the following with reference to the figures in which FIG. 1A illustrates s flow conduit insert in an exploded end view, FIG. 1BA illustrates flow conduit insert in an exploded perspective view, FIG. 2A-D illustrate guide elements in a transversal cross-sectional view, FIG. 3A-D illustrate guide elements in a longitudinal cross-sectional view, FIG. 4A illustrates guide elements in a side view, FIG. 4B-D illustrate guide elements in a cross-sectional view, FIG. 5A illustrates a flow conduit insert in an end view, FIG. 5B illustrates a first or second part in a longitudinal cross-sectional view, FIG. 5C illustrates a first or second part in a side view, FIG. 6 illustrates a flow conduit insert in a partly exploded perspective view, and FIG. 7 illustrates an ultrasonic flow meter in a cross-sectional side view.

DETAILED DESCRIPTION

Figure 1B:
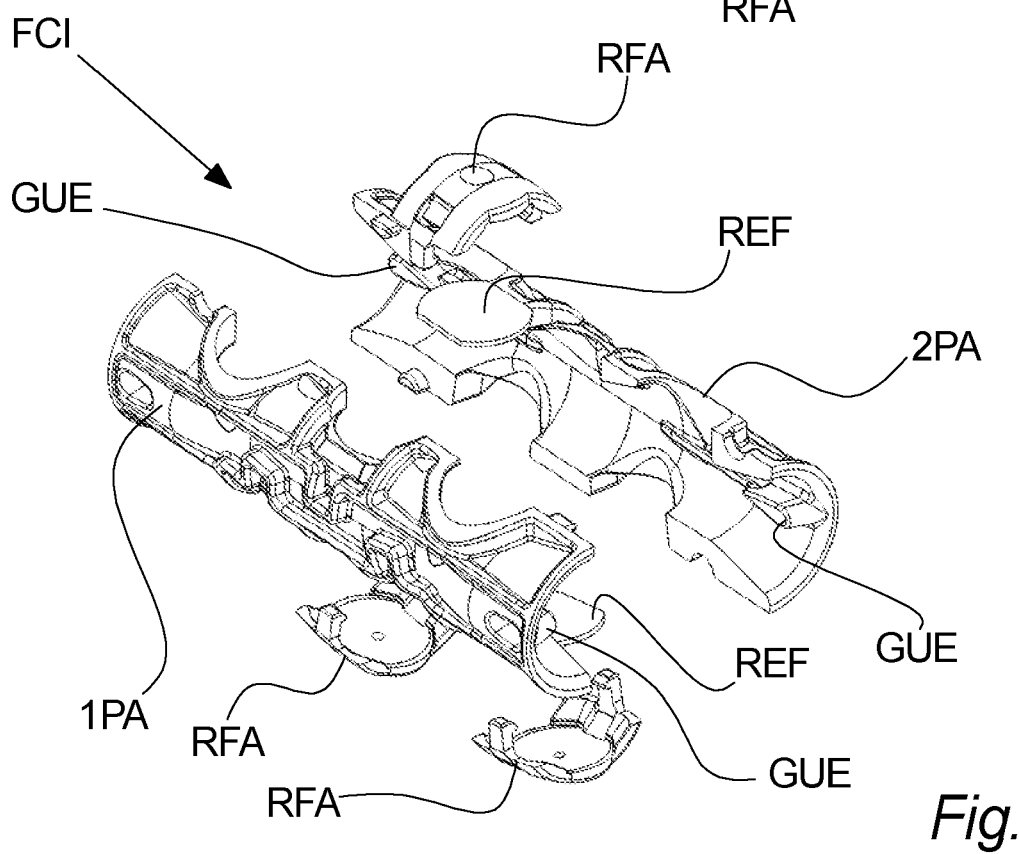

Referring to FIGS. 1A, 1B, and 6 a flow conduit insert FCI is illustrated according to an embodiment of the invention.

In FIG. 1A an exploded end view of the flow conduit insert FCI is shown, including a first part 1PA and a second part 2PA, whereas FIG. 1B shows an exploded perspective view of the flow conduit insert FCI is shown. FIG. 6 shows an assembled flow conduit insert FCI in a perspective view before installation of ultrasound reflectors REF.

The flow conduit insert FCI is for use in a flow conduit CON of an ultrasonic flow meter UFM, where the ultrasonic flow meter UFM is arranged to measure a flow of a liquid passing through the flow conduit CON by means of an ultrasound signal. The flow conduit insert FCI is adapted for being inserted into the inner space of the flow conduit CON. The flow conduit insert FCI is thus adapted and arranged for accommodating the entire path PTH in the flow conduit CON of the ultrasound signal.

Typically, the flow conduit insert FCI may be adapted for being inserted axially into the inner space of the flow conduit CON.

Furthermore, the flow conduit insert FCI has a first end 1EN and a second opposite 2EN end and an inner flow channel CHN. The first and second ends 1EN, 2EN are connected by the flow channel CHN. I.e. the inner flow channel CHN is a flow channel CHN inside the flow conduit insert FCI, from the first end 1EN to the second end 2EN. Thus, the inner flow channel CHN is formed as an inner space inside the flow conduit insert FCI, such that the flow conduit insert FCI completely surrounds the flow channel FCI from the first end 1EN of the flow channel CHN and to the second opposite end 2EN of the flow channel CHN, optionally except for one or more though-holes THR, THU.

The flow conduit insert FCI is adapted such that the flow of liquid passes through the flow channel CHN, when the flow conduit insert FCI has been installed in the flow conduit CON. The flow conduit insert FCI comprises a first and a second part 1PA, 2PA forming the flow channel CHN. The first and second ends 1EN, 2EN, which are opposite, and the inner flow channel CHN are illustrated in FIG. 6, showing the first and second parts 1PA, 2PA being assembled. The first and second parts 1PA, 2PA each extends from the first end 1EN to the second end 2EN.

Moreover, each of said first and second parts 1PA, 2PA comprises one or more guide elements GUE extending into the flow channel CHN.

Also, the flow conduit insert FCI may in some embodiments be adapted for supporting or fixating one or more ultrasound reflectors REF. The flow conduit insert FCI of the embodiment illustrated on FIGS. 1A-B and FIG. 6 is adapted for supporting three reflectors REF (only two reflectors REF shown in FIGS. 1A-B), but other embodiments may include support for no ultrasound reflectors REF, or support for fewer or more ultrasound reflectors REF, such as one, two four, five, or more ultrasound reflectors REF.

The flow conduit insert FCI illustrated on FIG. 6 comprises several through-holes; two through-holes THU for allowing passage of an ultrasonic signal in and out of the flow conduit insert FCI through its outer periphery OP, and three through-holes THR for receiving an ultrasound reflector REF (only one through-hole THR for receiving an ultrasound reflector can be seen on FIG. 6).

Also shown on FIGS. 1A-B is reflector fixation arrangements RFA. In the illustrated embodiment, each reflector fixation arrangement RFA is adapted for facilitating fixation of a single ultrasound reflectors REF, thus the flow conduit insert FCI of this embodiment requires three reflector fixation arrangements RFA to fixate its reflectors REF. The reflectors may be fixated between the flow conduit insert FCI and the reflector fixation arrangement RFA via fixation of the reflector fixation arrangement RFA to the flow conduit insert FCI.

In alternative embodiments, other means may be included in the flow conduit insert FCI for fixating the reflector(s) REF, or the reflector(s) REF may be fixated by the first and/or second parts themselves.

As can be seen on FIG. 6, the assembled flow conduit insert FCI has an outer periphery OP, which is more complex than a simple tubular shape, but still allows the flow conduit insert FCI to be supported by a tubular inner shape IS (see e.g. FIG. 7) of a flow conduit CON.

Now, referring to FIG. 2A-D some further principles of the guide elements GUE are illustrated. FIGS. 2A-D illustrate a first or second part 1PA, 2PA in a cross-sectional view along a plane transverse to the longitudinal center axis CAX (illustrated in FIG. 6) of the flow conduit insert FCI. Thus, the view in FIGS. 2A-D is in the same direction as illustrated in FIG. 1A.

The guide elements GUE illustrated in FIG. 2A-D may be used in the embodiments illustrated on FIGS. 1A-B and 6.

In one embodiment, illustrated on FIG. 2A, the guide element GUE is formed as a wing extending approximately halfway from the inner surface of the first or second part 1PA, 2PA to where the longitudinal center axis CAX (see e.g. FIG. 6) of the assembled flow conduit insert FCI will be.

In a further embodiment, illustrated in FIG. 2B, the guide element GUE is also shown has a wing and is shown having a broader width compared to FIG. 2A, but extending approximately the same distance into what will be the flow channel CHN. This illustrates that the guide element GUE here being formed as a wing may have various widths, depending on the particular setup.

Now in a still further embodiment, illustrated in FIG. 2C, the guide element GUE, also shown as a wing, extends into what will be the center of the flow channel CHN of the assembled flow conduit insert FCI. Thus, assembling a flow conduit insert FCI using a first and second part 1PA, 2PA both having this design, and where the guide element GUE is located in the same longitudinal position, would result in the two guide elements GUE coming into contact with each other.

Turning to the embodiment illustrated in FIG. 2D, it is illustrated that the first or second part 1PA, 2PA may comprise more than one guide element GUE in a single cross-sectional view, and thus in substantially the same longitudinal position, particularly here shown as three guide element. Similar to the embodiments illustrated in FIG. 2A-B, the three guide elements GUE of FIG. 2D extend only in the order of halfway into what is to be the left part of the flow channel. In alternative embodiments, the guide elements GUE, may also extend longer, such as illustrated in FIG. 2C. Finally, the first and/or second part 1PA, 2PA may alternatively comprise two guide elements in substantially the same longitudinal position, or more than three guide elements.

In all four embodiments, the guide element GUE is illustrated as forming an integral part of the first or second part 1PA, 2PA.

Practical considerations may come into play when designing the exact form of the guide elements GUE, for example the induced pressure drop of the liquid flowing through the flow channel CHN, the degree of correction of flow effects such as swirl and/or asymmetric flow, the simplicity of e.g. molding of the first and second parts 1PA, 2PA, etc.

Now referring to FIG. 3A-D, some further principles of the invention is illustrated according to embodiments of the invention. FIGS. 3A-D illustrates longitudinal cross-sections of part of a first or second part 1PA, 2PA of a flow conduit insert FCI.

In more detail, the views of FIG. 3A-D represent a cross section in a plane having the same orientation as the plane B illustrated in FIG. 1A.

The guide elements GUE on FIGS. 3A-D may have a wing-like shape, e.g. as shown in FIG. 2A or 2B or may have a different shape. Thus, the formed cross-sectional faces may be a representing plane of the guide element formed as a guide wing. Although the guide elements GUE on FIGS. 3A-D are adapted to extend only partly into the flow channel CHN, as the guide elements of FIGS. 2A-B and 2D, the same principle may also apply to a guide elements GUE extending fully into the flow channel CHN, as illustrated on FIG. 2C.

The guide element GUE illustrated in FIG. 3A is shown with a rectangular cross-section, i.e. having corners of 90 degrees.

The guide element GUE illustrated in FIG. 3B is shown with cut-off corners, such that all shown corners have angles of approximately 45 degrees. The exact angle may be variated for cut-off corners. However, a very important aspect of the embodiment shown on FIG. 3B is that the part of the edges facing in both directions is cut-off, and thus less than 90 degree. Thus, a cut-off corner will face the direction towards to flow of liquid, even if the direction of flow in the flow conduit CON is reversed.

Turning to FIG. 3C, a guide element GUE somewhat similar to what is shown in FIG. 3B is shown, only that the corners are rounded off, such that the edges are eliminated.

Now, on FIG. 3D a further example of a guide element GUE is shown. This guide element GUE has a rounded off corner in the direction facing towards the nearest end of the first or second part 1PA, 2PA. Alternatively, instead of using a rounded corner with FIG. 3D, a cut-off corner may be used instead. In some embodiments where only one corner is cut-off or rounded off, this corner may face in the away from the nearest end of the first or second part 1PA, 2PA.

The guide elements GUE as described in FIGS. 3A-D may be used in the embodiments illustrated in FIGS. 1A-B and 6.

Now, turning to FIG. 4A-D, guide elements 4A, as described in relation with FIGS. 1A, 1B, and 6 are shown. The guide element GUE may be used in flow conduit inserts FCI with or without reflectors REF. The shown guide elements GUE have wing-like cross-sections, explained in more detail below.

The guide element GUE of FIG. 4A has a cross-section illustrated in FIG. 4B showing a relatively hydrodynamic cross-section, i.e. a cross-section inducing a minimum of resistance to flow and which may also minimize any induced turbulent flow.

This cross-section shows a wing-shaped profile having a rounded of end facing towards the nearest end of the first or second part 1PA, 2PA and a gradually smaller thickness ending in a sharp edge facing towards the measuring region MR, as explained with FIG. 7.

FIG. 4B shows a very simple guide element GUE having a rectangular cross-section. Although such guide elements GUE may not necessarily be ideal for all ultrasonic flow meters, it may also have a flow correcting effect.

In FIG. 4D a further variant of a guide element GUE is shown, having a rectangular cross-section at one end, but then a gradual thinning of the width towards the opposite end ending in a relatively sharp edge.

The guide elements GUE of FIGS. 4A-D may be formed according to the embodiments illustrated on any of FIGS. 2A-D and 3A-D.

FIG. 5A-C illustrates a flow conduit insert FCI and a first or second part 1PA, 2PA thereof according to a further embodiments of the invention. The flow conduit insert FCI may be devised as explained with FIGS. 1A-B and 6, with or without reflectors REF.

First, FIG. 5A shows an end view of a flow conduit insert FCI, comprising a first and second part 1PA, 2PA, each comprising two guide elements GUE.

FIG. 5B shows a cross-section along the A-A section indicated on FIG. 5A. FIG. 5B shows a guide element GUE at each end of the first part 1PA, thus having a configuration with two flow correcting regions FCR and a measuring region MR in between, as explained with FIG. 7.

The first part 1PA of the flow conduit insert FCI shown in FIG. 5B comprises three through-holes THR, each through-hole THR being adapted for receiving an ultrasound reflector REF. FIG. 5B illustrate the three corresponding ultrasound reflectors REF already being fixated to the flow conduit insert FCI, each reflector REF being fixated between a corresponding reflector fixation arrangement RFA and the first and second part 1PA, 2PA. In some alternative embodiments, the number of reflectors REF may be different, or no reflector REF is used.

Also, the first part 1PA of the flow conduit insert FCI shows two through-holes THU for receiving an ultrasound signal an allowing the ultrasound signal to leave again.

The second part 2PA is devised in a similar, but not necessarily identical fashion, in order to match the first part 1PA.

FIG. 5C shows a similar first part 1PA, however without any reflectors REF. Instead, the first part 1PA of the flow conduit insert FCI shows two through-hole THU for receiving an ultrasound signal and allowing the ultrasound signal to leave again, and a further through-hole THU shown in the bottom center of the first part 1PA, this through-hole THU allowing the ultrasound signal to be reflected of the inner wall of a flow conduit CON, when this is devised in a suitable material, such as e.g. brass.

As an alternative to FIG. 5C, a single ultrasound reflector REF may be used (similar to FIG. 5B), instead of relying on reflection by the inner wall of the flow conduit CON.

Furthermore, each of FIGS. 5A-C illustrates a flow tube insert FCI or a first part 1PA thereof having an outer periphery OP. For FIGS. 5B-C, which shows only the first part 1PA, this first part 1PA still forms part of the flow conduit insert FCI, and thus also forms part of the outer periphery OP of the flow conduit insert FCI. Thus, the outer periphery OP indicated for FIGS. 5B-C would only form part of the outer periphery OP of the assembled flow conduit insert FCI, examples of which are illustrated on e.g. FIGS. 5A and 6.

Turning now to FIG. 7, an ultrasonic flow meter UFM is illustrated according to an embodiment of the invention. The ultrasonic flow meter UFM comprises a housing HOU, a flow conduit CON, and a flow conduit insert FCI as described in relation to FIGS. 1A-B and 6. The flow conduit insert FCI is arranged in the flow conduit CON, and is adapted for measuring a flow of a liquid passing through the flow conduit CON.

Furthermore, the ultrasonic flow meter UFM may typically comprise two ultrasonic transducers 1TR, 2TR, as illustrated on FIG. 7. The ultrasonic transducers 1TR, 2TR may then be adapted for measuring the flow of a liquid flowing through the flow conduit CON by means of transit time measurement.

Even further, the ultrasonic flow meter UFM shown in FIG. 7 comprises three ultrasound reflectors REF being arranged for reflecting an ultrasound signal emitted from one of the ultrasonic transducers 1TR, 2TR in a direction along a predefined path ending at the other ultrasonic transducer 2TR, 1TR, and vice versa. Thus, an ultrasound signal emitted by one of the ultrasonic transducers 1TR, 2TR may then be reflected by the first ultrasound reflector REF in a direction towards the second ultrasound reflector REF, where it is again reflected in a direction towards the third ultrasound reflector REF, where it is finally reflected in a direction towards the other ultrasonic transducer 2TR, 1TR. When the role of the first and second ultrasonic transducers 1TR, 2TR, being the emitter and the receiver, respectfully, of the ultrasound signal, is reversed, the ultrasound signal may then travel along the same path, but in the opposite direction, via the three ultrasound reflectors.

In alternative embodiments, the ultrasonic flow meter UFM may comprise fewer or more ultrasound reflectors REF, or may in some cases be without reflectors, e.g. if the inner wall of the flow conduit CON is made of an ultrasound reflecting material, such as e.g. brass.

Furthermore, the ultrasonic flow meter UFM may furthermore typically comprise one or more of a control circuit for controlling the operation of the meter, a display for displaying information to an adjacent person, a radio interface for communicating with an external receiver e.g. in order to transit metering data, a battery for powering the meter and further electrical circuitry for suitably connecting the components.

Furthermore, FIG. 7 also illustrates that the flow conduit CON has an inner shape IS, on FIG. 7 characterized by a certain diameter. Also, the shape may be defined by is form, i.e. for example if it has a tubular form, or has a form with a rectangular or quadratic transversal cross-section.

FIG. 7 also illustrate that the path PTH of the ultrasound signal is defined by the first and second ultrasonic transducers 1TR, 2TR, in collaboration with the ultrasound reflectors REF, if any. In FIG. 7, the three ultrasound reflectors ensure that an ultrasound signal emitted by the first ultrasonic transducer 1TR is guided, by successive reflections, only the second ultrasonic transducer 2TR.

FIG. 7 also illustrates a principle, which may be valid for some embodiments, regardless of the other details shown in FIG. 7. The flow conduit insert comprises or consists of three regions along the longitudinal direction CAX. The three regions is two flow correcting regions FCR and one measuring region MR, where the measuring region MR is positioned between the two flow correcting regions FCR. With some flow conduit inserts FCI using this configuration, but not necessarily all, each flow correcting region FCR comprises at least one guide element GUE or one group of guide elements GUE.

FIGURE REFERENCES

FCI. Flow conduit insert
CON. Flow conduit
UFM. Ultrasonic utility flow meter
CHN. Flow channel
GUE. Guide element
CAX. Longitudinal center axis
HOU. Housing
1EN. First end of the flow conduit insert 2EN. Second end of the flow conduit insert
1PA. First part of the flow conduit insert
2PA. Second part of the flow conduit insert
PTH. Path of the ultrasound signal
OP. Outer periphery of the flow conduit insert
IS. Inner shape of the flow conduit
REF. Ultrasound reflector
1TR. First ultrasonic transducer
2TR. Second ultrasonic transducer
FCR. Flow correcting region
MR. Measuring region
THU. Through-hole for allowing passage of an ultrasound signal
THR. Through-hole for receiving a reflector
B. Plane

The invention claimed is:

1. A flow conduit insert for a flow conduit of an ultrasonic utility flow meter,
the ultrasonic utility flow meter being arranged to measure a flow of a liquid passing through the flow conduit by means of an ultrasound signal,
the flow conduit insert being adapted for being inserted into the inner space of the flow conduit,
the flow conduit insert being adapted for accommodating the entire path in the flow conduit of the ultrasound signal,
the flow conduit insert having a first end and a second opposite end and an inner flow channel, said first and second ends being connected by the flow channel, the flow conduit insert being adapted such that the flow of liquid passes through the flow channel,
wherein the flow conduit insert comprises a first and a second part forming the flow channel, said first and second parts each extending from said first end to said second end,
wherein each of said first and second parts comprises one or more guide elements extending into the flow channel.

2. The flow conduit insert according to claim 1, wherein the flow conduit insert has an outer periphery corresponding to the inner shape of the flow conduit.

3. The flow conduit insert according to claim 1, wherein said outer periphery comprises a first and a second through-hole, for allowing the ultrasound signal to enter and leave the flow channel through the outer periphery.

4. The flow conduit insert according to claim 1, wherein the flow conduit insert having an elongated shape.

5. The flow conduit insert according to claim 1, wherein the flow conduit insert is adapted for increasing the flow velocity of the liquid through the flow channel.

6. The flow conduit insert according to claim 1, wherein the one or more guide elements comprises one or more guide wings.

7. The flow conduit insert according to claim 1, wherein the one or more guide elements are substantially parallel with a longitudinal direction of the flow conduit insert.

8. The flow conduit insert according to claim 1, wherein the longitudinal center axis of the flow conduit is free of contact with the flow conduit insert, including the guide elements thereof.

9. The flow conduit insert according to claim 1, wherein the flow conduit insert is adapted to allow a line of sight through the inner flow channel.

10. The flow conduit insert according to claim 1, wherein the flow conduit insert is adapted for supporting one or more ultrasound reflectors.

11. The flow conduit insert according to claim 1, wherein the flow conduit insert is adapted for receiving one or more reflector fixation arrangements, the first and/or second part together with the one or more reflector fixation arrangements being adapted for fixating one or more ultrasound reflectors.

12. The flow conduit insert according to claim 1, wherein the ultrasonic flow meter comprises at least three ultrasound reflectors and a first and second ultrasonic transducer,
wherein each of the first and second ultrasonic transducer are arranged for emitting an ultrasound signal in a non-orthogonal direction relative to the longitudinal direction of the flow conduit, for example in a direction oriented with an angle between 10 and 80 degrees relative to said longitudinal direction.

13. The flow conduit insert according to claim 1, wherein at least one guide element of the first part and at least one guide element of the second part are arranged in a group, such that these at least two guide elements are arranged at substantially the same longitudinal position.

14. The flow conduit insert according to claim 1, wherein the flow conduit insert comprises three regions along the longitudinal direction of the flow conduit insert, said three regions being two flow correcting regions and one measuring region, where the measuring region is positioned between the two flow correcting regions, and where each flow correcting region comprises at least one group of guide elements comprising at least one guide element of the first part and at least one guide element of the second part arranged at substantially the same longitudinal position of the flow conduit insert.

15. The flow conduit insert according to claim 1, wherein each of the guide elements has a transversal cross-sectional area of no more than 15 percent of the corresponding transversal cross-sectional area of the flow channel.

16. The flow conduit insert according to claim 1, wherein said first and second parts are substantially symmetric, for example by having a mirror symmetry in a plane parallel to the longitudinal direction of the flow conduit insert, or by being substantially identical.

17. The flow conduit insert according to claim 1, wherein the one or more guide elements comprises one or more guide wings having rounded-off or cut-off corners.

18. The flow conduit insert according to claim 1, wherein the one or more guide elements comprises one or more guide wings each having two opposite surfaces for contacting the liquid, the two surfaces having mirror symmetry in a plane being substantially parallel with the longitudinal direction of the flow conduit insert.

19. The flow conduit insert according to claim 1, wherein the one or more guide elements comprises one or more guide wings being substantially parallel to the longitudinal direction of the flow conduit insert, and wherein the guide wings have a broader width in the end facing towards the nearest end of the flow conduit insert compared to the width in the end facing in the opposite direction.

20. The flow conduit insert according to claim 1, wherein the ultrasonic flow meter comprises two ultrasonic transducers adapted for measuring the flow of the liquid flowing through the flow conduit by means of transit time measurement.

21. The flow conduit insert according to claim 1, wherein the guide elements are formed as guide wings defined by a plane being substantially orthogonal to a plane dividing the first and second parts.

22. The flow conduit insert according to claim 1, wherein the first and second parts are made substantially from a composite material.

23. The flow conduit insert according to claim 1, wherein the first and/or second parts are formed by molding.

24. The flow conduit insert according to claim 23, wherein the first and/or second parts are free of undercuts.

25. An ultrasonic flow meter comprising a flow conduit and a flow conduit insert, the flow conduit insert being arranged in the flow conduit, and the ultrasonic flow meter being adapted for measuring a flow of a liquid passing through the flow conduit by means of an ultrasound signal, the flow conduit insert being adapted for accommodating the entire path in the flow conduit of the ultrasound signal, the flow conduit insert having a first end and a second opposite end and an inner flow channel, said first and second ends being connected by the flow channel, the flow conduit insert being adapted such that the flow of liquid passes through the flow channel, wherein the flow conduit insert comprises a first and a second part forming the flow channel, said first and second parts each extending from said first end to said second end, wherein each of said first and second parts comprises one or more guide elements extending into the flow channel.

26. The ultrasonic flow meter according to claim 25, wherein the ultrasonic flow meter comprises two ultrasonic transducers adapted for measuring the flow of the liquid flowing through the flow conduit by means of transit time measurement.

27. The ultrasonic flow meter according to claim 25, wherein the ultrasonic flow meter comprises one or more reflectors, said one or more ultrasound reflectors being arranged for reflecting an ultrasound signal emitted from one of the ultrasonic transducers in a direction along a predefined path ending at the other ultrasonic transducer, and vice versa.

* * * * *